United States Patent [19]

Harnisch et al.

[11] 4,268,668
[45] May 19, 1981

[54] ACID MONOMETHINE-METAL COMPLEX DYESTUFFS

[75] Inventors: Horst Harnisch, Much; Peter Rasche, Aachen, both of Fed. Rep. of Germany

[73] Assignee: Bayer Aktiengesellschaft, Leverkusen, Fed. Rep. of Germany

[21] Appl. No.: 86,614

[22] Filed: Oct. 19, 1979

[30] Foreign Application Priority Data

Nov. 9, 1978 [DE] Fed. Rep. of Germany ....... 2848622

[51] Int. Cl.³ .................. C07F 13/00; C07F 15/04; C07F 15/06
[52] U.S. Cl. .................................. 8/685; 8/917; 8/924; 542/451; 542/452; 544/4; 544/64; 544/181; 544/225; 546/2; 546/10; 548/108
[58] Field of Search .................. 548/108; 546/2, 10; 544/4, 64, 181, 225; 542/451, 452; 8/685

[56] References Cited

U.S. PATENT DOCUMENTS

| | | | |
|---|---|---|---|
| 2,407,346 | 9/1946 | Rogers et al. | 542/45 A |
| 3,897,439 | 7/1975 | Frey | 548/108 |
| 3,927,005 | 12/1975 | Harnisch | 542/452 |
| 3,959,310 | 5/1976 | Brack et al. | 542/452 |
| 4,065,462 | 12/1977 | Frey et al. | 548/108 |
| 4,097,484 | 6/1978 | Zelewsky et al. | 548/108 |

FOREIGN PATENT DOCUMENTS 2415055  10/1975  Fed. Rep. of Germany ....... 542/452

*Primary Examiner*—Arthur P. Demers
*Attorney, Agent, or Firm*—Sprung, Felfe, Horn, Lynch & Kramer

[57] ABSTRACT

An acid monomethine-metal complex dyestuff of the formula

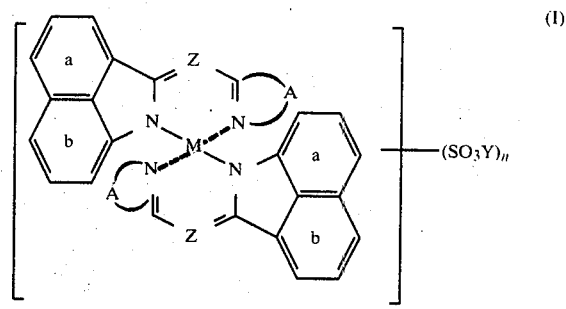

wherein M, Z, R, A, Y, n, a and b have the meaning given in the description.

The acid metal complex dyestuffs of the formula I are valuable dyestuffs which are outstandingly suitable for dyeing and printing wool, silk and especially synthetic polyamides, such as NYLON and PERLON, in very clear shades ranging from yellow to blue, and are distinguished by high tinctorial strength, good build-up capacity and affinity and very good fastness characteristics, especially fastness to light.

4 Claims, 2 Drawing Figures

ACID MONOMETHINE-METAL COMPLEX DYESTUFFS

The invention relates to acid metal complex dyestuffs of the general formula

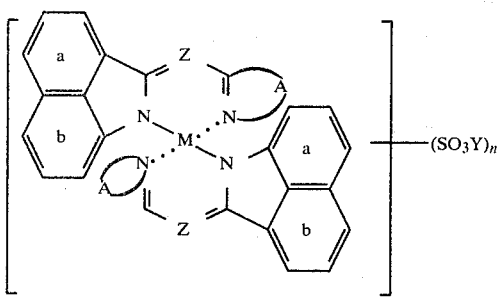

wherein

M represents a divalent metal atom of the first, second, seventh or eighth sub-group of the periodic table, Z represents =N— or =C(R)—, R represents hydrogen or, preferably, an electron-attracting radical, A represents the remaining members of a heterocyclic ring system, Y represents hydrogen or the monovalent equivalent of a cation and n represents an integer from 2 to 8 and wherein one or two 5-membered or 6-membered carbocyclic and/or heterocyclic rings can be fused to the rings a and b, and the cyclic and acyclic radicals can carry non-ionic substituents and/or carboxyl groups, and to a process for their preparation, and to their use for dyeing and printing wool and, in particular, synthetic polyamides.

Preferred divalent metals M are manganese, iron, nickel, cobalt, zinc and copper.

Electron-attracting radicals R can be cyclic or acyclic. Examples of cyclic radicals R which may be mentioned are p-nitrophenyl or a radical of the formula

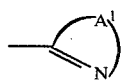

wherein $A^1$ represents the remaining members of a heterocyclic ring system and in a particular case can also have the same meaning as A.

Examples of suitable acyclic electron-attracting radicals R are nitro, $C_1$-$C_4$-alkylcarbonyl, $C_1$-$C_4$-alkylsulphonyl, phenylsulphonyl (which may also be substituted, for example by $C_1$-$C_4$-alkyl or chlorine), and groups derived from the carboxylic acid group, such as amide, ester or nitrile groups. Carboxylic acid amide groups can be unsubstituted or be monosubstituted or disubstituted, for example by $C_1$-$C_4$-alkyl or benzyl and/or phenyl and can also be a carbopiperidide, carbopyrrolidide, carbomorpholide or carbopiperazide. Preferred carboxylic acid ester groups are the $C_1$-$C_4$-alkyl, benzyl and phenyl ester groups. The particularly preferred meaning of R is nitrile.

Suitable heterocyclic ring systems completed by A and/or $A^1$ can be monocyclic or polycyclic. They are preferably made up of a 5-membered or 6-membered heterocyclic ring of quasi-aromatic character, to which are optionally fused one to three, preferably one or two, benzo or heteroareno rings (such as pyridino or quinoxaline). In addition, one or two partially saturated 5-membered or 6-membered rings may be fused to them, such as, for example, fused dioxole, dioxine or cyclohexene rings formed by —O—$CH_2$—O—, —O—$CH_2$—$CH_2$—O—, —O—$CH_2$—O—$CH_2$—, —$CH_2$—$C(CH_3)_2$—$CH_2$— or —$(CH_2)_4$— radicals present as substituents in the 1,2-position.

Examples of heterocyclic ring systems completed by A belong to the imidazole, benzimidazole, oxazole, benzoxazole, 1,3,4-oxidazole, thiazole, isothiazole, 1,2,4- or 1,3,4-thiadiazole, benzthiazole, naphthothiazole, pyridine, quinoline, isoquinoline, pyrimidine, quinazoline, pyrazine, quinoxaline, pyrazole, indazole, 3,3-dimethylindolenine, benz[c,d]indole, 1,2,3- or 1,3,4-triazole, 1,3,5-triazine or benzothiadiazine series. Benzoxazole, benzimidazole, benzthiazole, thiazole, 1,3,4-oxdiazole, 1,3,4-thiadiazole and quinazoline radicals are preferred.

Preferred cations Y are alkali metal ions and ammonium ions as well as the monovalent equivalents of M. The organic cations usual in dyestuff chemistry, such as ammonium ions which are mono-, di-, tri- or tetra- substituted by $C_1$-$C_4$-alkyl and/or benzyl, with the said alkyl radicals being optionally hydroxyl-substituted, as well as cyclammonium cations of the type of the pyridinium salts, are also suitable.

For special applications, for example for producing colour lakes for paints, cations which result in sparing solubility, such as $Ca^{++}$, $Ba^{++}$ and $Al^{+++}$, may also be used.

The 5-membered or 6-membered carbocyclic and/or heterocyclic rings fused to the rings a and b can be partially saturated or, preferably can be of aromatic character. Such fused rings are in each case formally produced by linking o-positions of the rings a or b to 3-membered or 4-membered divalent radicals or by linking the peri-position of a and b to 2-membered or 3-membered divalent radicals. Such divalent radicals are, in particular, saturated or unsaturated hydrocarbons which can contain one or two hetero-atoms, such as oxygen, sulphur and nitrogen, or the —NH—CO radical. Where such a divalent, formally ring-forming radical is itself a ring or contains a ring, this ring is preferably an optionally substituted o-phenylene ring which can contain methyl, methoxy, ethoxy, chlorine, bromine, nitro or sulpho as particularly preferred substituents.

The following may be mentioned as examples of such ring-forming radicals: —$CH_2$—$CH_2$—CH—, —$CH_2$—$CH_2$—$CH_2$—$CH_2$—, —O—$CH_2$—O—$CH_2$—, —O—$CH_2$—$CH_2$—O—, —O—$CH_2$—$CH_2$—, —CH=CH—CH=CH—, —N=CH—CH=CH—, —CH=CH—$C_6H_4$(o)—, —CO—$C_6H_4$(o)—, —NH—CO—, —O—$C_6H_4$(o)—, —NR'—$C_6H_4$(o)— and —S—$C_6H_4$(o)—, the five last-mentioned radicals being linked to the peri-position of a and b, the three last-mentioned preferably in such a way that the hetero-atom is in each case bonded to the ring a, with R' being H, $C_1$-$C_4$-alkyl, benzyl or phenyl. A —S—$C_6H_4$(o)— or —CO—$C_6H_4$(o)— radical linked in the stated manner and optionally substituted in the aromatic ring by $C_1$-$C_4$-alkyl, $CH_3O$, $C_2H_5O$, Cl, Br, nitro or sulpho is preferred.

Suitable non-ionic substituents are those usually employed in dyestuff chemistry. Examples are $C_1$-$C_4$-alkyl, $CF_3$, benzyl, phenyl, chlorine, bromine, iodine, fluorine, nitro, the $C_1$-$C_4$-alkyl, $C_1$-$C_4$-alkoxy-$C_1$-$C_4$-alkyl, benzyl and phenyl esters of the sulphonic acid or carboxylic acid group, $C_1$-$C_4$-alkylcarbonyl, $C_1$-$C_4$-alkylsulphonyl, phenylsulphonyl, benzoyl, sulphamoyl and carbamoyl radicals the latter two being optionally substituted by one or two $C_1$-$C_4$-alkyl, benzyl or phenyl groups, as well as carbo- or sulpho-pyrrolidide, -piperidide, -morpholide or -piperazide, cyano, $C_1$-$C_4$-alkoxy radicals (which can also be further substituted by hydroxyl or $C_1$-$C_4$-alkoxy), phenoxy, phenylmercapto, $C_1$-$C_4$-alkylmercapto, optionally $C_1$-$C_2$-alkyl-, benzyl- and/or phenyl-monosubstituted or -disubstituted amino, piperidino, pyrrolidino, morpholino, acylamino and radicals containing reactive groups, such as the $\beta$-sulphatoethylsulphonyl group. Acyl in acylamino radicals denotes $C_1$-$C_4$-alkylcarbonyl, $C_1$-$C_4$-alkylsulphonyl, benzoyl, phenylsulphonyl and $C_1$-$C_4$-alkoxycarbonyl. All the above phenyl and benzyl radicals can be further substituted, for example by $C_1$-$C_4$-alkyl, $C_1$-$C_4$-alkoxy, chlorine or bromine.

Within the scope of the invention, preferred acid metal complex dyestuffs correspond to the formula

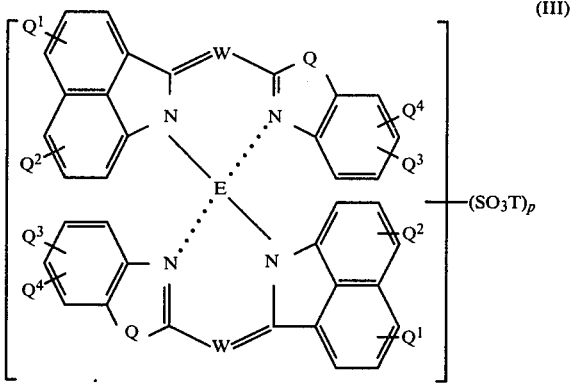

(III)

wherein
W represents =N— or =C(CN)—,
E represents divalent nickel, cobalt, zinc or copper,
Q represents —S—, —O— or —N(D)—,
D represents hydrogen, optionally OH—, Cl—, CN—, $C_1$-$C_4$-alkoxycarbonyl- or $CONH_2$-substituted $C_1$-$C_3$-alkyl, benzyl or phenyl, or $C_1$-$C_2$-alkoxycarbonyl,
T represents hydrogen, an alkali metal or ammonium ion or the monovalent equivalent of E,
p represents the numbers 2, 4 or 6,
$Q^1$ represents hydrogen, chlorine, bromine, $C_1$-$C_2$-alkoxy, CN, carboxyl, $C_1$-$C_4$-alkoxycarbonyl or a carbamoyl radical which is optionally substituted by one or two $C_1$-$C_4$-alkyl radicals,
$Q^2$ represents hydrogen, $C_1$-$C_2$-alkyl, chlorine, bromine, iodine, $C_1$-$C_4$-alkoxycarbonyl, benzoyl, $C_1$-$C_4$-alkylsulphonyl, including $\beta$-sulphatoethylsulphonyl, benzylsulphonyl, phenylsulphonyl, nitro, cyano, $C_1$-$C_4$-alkoxycarbonyl, carboxyl, a sulphamoyl or carbamoyl radical which is optionaly mono-substituted or disubstituted by $C_1$-$C_4$-alkyl, benzyl and/or phenyl radicals, amino, acetylamino, $C_1$-$C_4$-alkylsulphonylamino, phenylsulphonylamino, di-($C_1$-$C_4$-alkyl)-amino, piperidino, morpholino, pyrrolidino, $C_1$-$C_4$-alkoxy, phenoxy, $C_1$-$C_4$-alkylmercapto or phenylmercapto, $Q^1$ and $Q^2$ together can also represent o-phenylenemercapto or o-phenylenecarbonyl, $Q^3$ represents hydrogen, $C_1$-$C_4$-alkyl, $CF_3$, chlorine, bromine, $C_1$-$C_4$-alkoxy (which is optionally substituted by OH, $C_1$-$C_4$-alkoxy or chlorine), phenoxy, phenyl, benzyl, cyclohexyl, $C_1$-$C_4$-alkoxycarbonyl, CN, carboxyl, $C_1$-$C_4$-alkylsulphonyl, phenylsulphonyl, nitro, $C_1$-$C_4$-alkylmercapto or a sulphamoyl or carbamoyl radical which is optionally substituted by one or two $C_1$-$C_4$-alkyl radicals, $Q^4$ represents hydrogen, $C_1$-$C_4$-alkyl, $CF_3$, chlorine, bromine, $C_1$-$C_2$-alkoxy or phenyl and $Q^3$ and $Q^4$ together, when in the o-position to one another, can also represent divalent radicals of the formula —O—$CH_2$—O—, —O—$CH_2$—$CH_2$—O—, —O—$CH_2$—O—$CH_2$—, —CH=CH—CH=CH—, —($CH_2$)$_4$— or —$CH_2$—$C(CH_3)_2$—$CH_2$—.

Dyestuffs of particular industrial importance are those of the formula III, in which
Q represents —S— or —O—,
$Q^1$ and $Q^2$ represent hydrogen,
$Q^3$ represents hydrogen, $C_1$-$C_4$-alkyl, chlorine, bromine, $C_1$-$C_4$-alkoxy, $C_1$-$C_4$-alkylsulphonyl, nitro or sulphamoyl and
$Q^4$ represents hydrogen, methyl or chlorine,
and wherein in each case one of the $SO_3T$ groups in the 1,8-naphtholactam occupies the p-position relative to the ring nitrogen atom.

Compounds of the formula III, wherein W is =C(CN)— are of particular industrial value.

A process for the preparation of compounds of the formula I is characterised in that acid monomethine dyestuffs of the formula

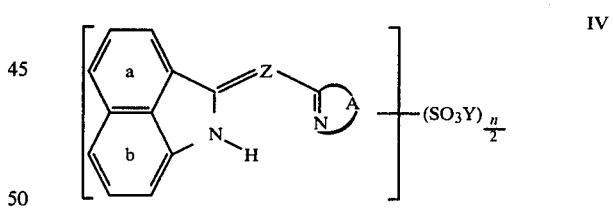

IV wherein Z, A, Y and n have the abovementioned meanings, are reacted with $M^{++}$-donors, especially with $M^{++}$-salts. The reaction is carried out in a polar solvent, especially in water, at an elevated temperature, for example at 30° to 130° C., preferably at 40° to 100° C., and the presence of an acid acceptor, such as acetate ions or ammonia, assists the reaction. The monomethines IV and the $M^{++}$-salts react in the molar ratio of 2:1.

The starting compounds of the formula IV are in some cases known (German Offenlegungsschriften Nos. 2,064,103, 2,357,442, 2,551,575, 2,724,444, 2,724,493, 2,724,540, 2,724,541 and 2,736,914), or are obtainable in accordance with known methods, for example by condensing naphtholactam compounds of the formula

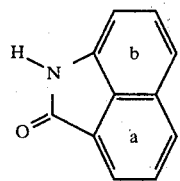 (V)

wherein a and b have the same meaning as in formula I, with compounds of the formula

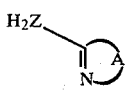 (VI)

wherein Z and A have the abovementioned meaning in the presence of POCl₃ and subsequently sulphonating the resulting monomethine dyestuffs of the formula

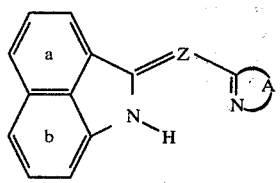 (VII)

n/2-fold.

Where Z is =C(CN)—, the nitrile group remains preserved during sulphonation and aqueous working up and is not—as is erroneously assumed in German Offenlegungsschriften Nos. 2,064,103 and 2,357,442—saponified to the CONH₂ group.

Examples of compounds of the formula V are 1,8-naphtholactam, 4-chloro-1,8-naphtholactam, 4-bromo-1,8-naphtholactam, 2,4-dichloro-1,8-naphtholactam, 2,4-dibromo-1,8-naphtholactam, 4-nitro-1,8-naphtholactam, 4-methylsulphonyl-1,8-naphtholactam, 4-morpholinosulphonyl-1,8-naphtholactam, 4-phenylmercapto-1,8-naphtholactam, 2-methyl-1,8-naphtholactam, 4-benzoyl-1,8-naphtholactam, 4-methoxy-1,8-naphtholactam, 4-ethoxy-1,8-naphtholactam, 4-cyano-1,8-naphtholactam, 5-ethoxycarbonyl-1,8-naphtholactam, 5-cyano-1,8-naphtholactam, 4-dimethylamino-1,8-naphtholactam, 4,5-dichloro-1,8-naphtholactam, 4,5-dibromo-1,8-naphtholactam and the compounds

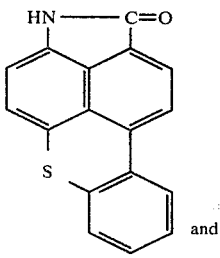 (VIII)

and

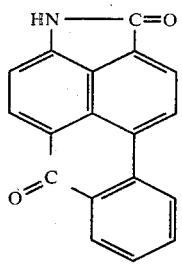 (IX)

Examples of compounds of the formula VI are: 2-cyanomethylbenzthiazole, 2-cyanomethyl-6-methoxybenzthiazole, 2-cyanomethyl-6-ethoxybenzthiazole, 2-cyanomethyl-6-methylbenzthiazole, 2-cyanomethyl-6-chlorobenzthiazole, 2-cyanomethyl-6-nitrobenzthiazole, 2-cyanomethyl-6-phenylaminobenzthiazole, 2-cyanomethylbenzoxazole, 2-cyanomethyl-5-methylbenzoxazole, 2-cyanomethyl-5-chlorobenzoxazole, 2-cyanomethyl-5,6-dimethylbenzoxazole, 2-cyanomethyl-5,7-dimethylbenzoxazole, 2-cyanomethyl-5-chloro-7-methylbenzoxazole, 2-cyanomethyl-5-methylsulphonylbenzoxazole, 2-cyanomethyl-5-sulphamoylbenzoxazole, 2-cyanomethyl-5-phenylbenzoxazole, 2-cyanomethyl-5-cyclohexylbenzoxazole, 2-cyanomethyl-5,7-dichlorobenzoxazole, 2-cyanomethyl-5-methoxycarbonylbenzoxazole, 2-cyanomethylbenzimidazole, 2-cyanomethyl-5-carboxybenzimidazole, 2-cyanomethyl-5-methylsulphonylbenzimidazole, 2-cyanomethyl-5-ethylsulphonylbenzimidazole, 2-cyanomethyl-5-chlorobenzimidazole, 2-cyanomethyl-5-methylbenzimidazole, 2-cyanomethyl-1-methylbenzimidazole, 2-cyanomethyl-1-phenylbenzimidazole, 2-cyanomethyl-1-benzylbenzimidazole, cyanoacetic acid benzoylhydrazide (the precursor of 2-cyanomethyl-5-phenyl-1,3,4-oxdiazole), cyanomethyl-5-phenyl-1,3,4-thiadiazole, 2-cyanomethylquinazolin-4-one, 1-methyl-3-cyanomethylquinoxalin-2-one, 3-cyanomethylbenzo-1,2,4-thiadiazine-1,1-dioxide, 3-cyanomethyl-2-methylbenzo-1,2,4-thiadiazine-1,1-dioxide, 2-cyanomethyl-4-phenylthiazole, 2-cyanomethyl-3-phenyl-1,2,4-oxadiazole, 4-cyanomethyl-pyridine, 2-cyanomethylquinoline, 2-aminobenzthiazole, 2-amino-6-methoxybenzthiazole, 2-amino-6-β-hydroxyethoxybenzthiazole, 2-amino-6-chlorobenzthiazole, 2-amino-6-methylbenzthiazole, 2-amino-6-nitrobenzthiazole, 2-amino-5,6-methylenedioxybenzthiazole, 2-amino-4-phenylthiazole, 3-amino-1,2,4-triazole, 2-aminopyridine, 2-aminoquinoline, 2-aminopyrimidine and 5-amino-3-phenyl-1,2,4-thiadiazole.

The acid metal complex dyestuffs of the formula I are valuable dyestuffs which are outstandingly suitable for dyeing and printing wool, silk and, in particular, synthetic polyamides, such as NYLON and PERLON, in very clear shades ranging from yellow to blue and which are distinguished by high tinctorial strength, good build-up capacity and affinity, and very good fastness characteristics, especially fastness to light. They are also particularly suitable for use in the mass colouring of polyamides by spin-dyeing.

The acid metal complex dyestuffs of the formula I can in some cases also be produced by post-metallising in the wool or polyamide fibres. For this purpose, the prodedure followed is to treat polyamide or wool, which has been dyed with acid dyestuffs IV, with aqueous solutions of $M^{++}$-salts, such as copper-II sulphate, zinc acetate, nickel-II nitrate, manganese-II sulphate or cobalt-II chloride. This reaction is carried out at temperatures ranging from 60° to 100° C., preferably at 90° to 100° C. All the M++ ions mentioned are suitable for the post-metallising of wool, whilst zinc ions are particularly suitable in the case of synthetic polyamide.

The subsequent metallising of fibres or fabrics dyed under weakly acid conditions is preferably carried out in the presence of an acid buffer, such as acetate or secondary phosphate ions.

EXAMPLE 1

12.8 g of dyestuff of the formula

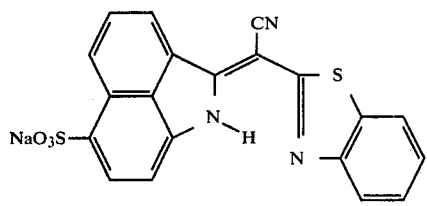
(1a)

prepared according to German Offenlegungsschrift No. 2,357,442, Example 11 (the formula given there erroneously shows $CONH_2$ instead of CN) are dissolved in 250 ml of hot water, 21.8 g of copper-II acetate are added, the mixture is boiled under reflux for 15 minutes and is filtered hot, 30 ml of saturated sodium chloride solution are added and the batch is cooled, whilst stirring. After 5 hours, the crystalline precipitate is filtered off, thoroughly pressed out and dried in vacuo at 50° C. 12 g of the copper-II complex dyestuff of the formula

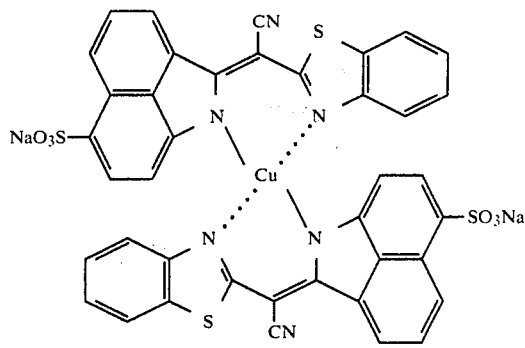
(1)

are obtained as violet crystals. The compound dyes synthetic polyamide from neutral solution in a clear reddish violet having very good fastness characteristics.

The following metal complexes of (1a) having an equivalent structure and similar valuable tinctorial properties, are prepared analogously: (2) Co-II complex (clear reddish violet), (3) Zn-II complex (clear scarlet).

In the preparation of the Mn-II, Fe-II and Ni-II complexes, 25% strength aqueous ammonia is additionally introduced dropwise during the reaction to give a pH value of 6.5–7; these complexes have the following colours: (4) Ni-II complex (clear reddish violet), (5) Mn-II complex (neutral red), (5a) Fe-II complex (neutral red).

The acid metal complex dyestuffs listed in the table which follows are also prepared analogously from the corresponding starting compounds.

Acid metal complex dyestuffs of the formula

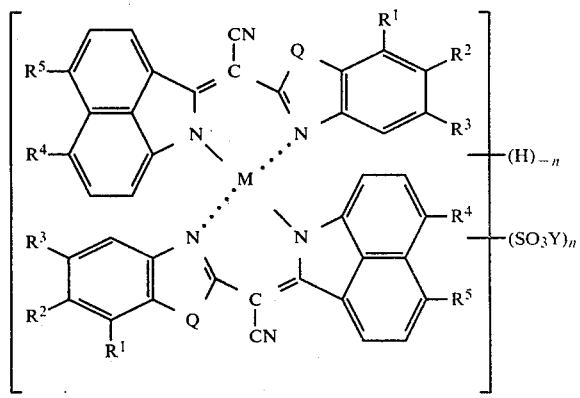

| No. | M (+2) | Y | n | Q | $R^1$ | $R^2$ | $R^3$ | $R^4$ | $R^5$ | Colour shade (Polyamid) |
|---|---|---|---|---|---|---|---|---|---|---|
| 6 | Cu | Na+ | 2 and 4 | S | H | $OCH_3$ | H | $SO_3Y$ | H | reddish violet |
| 7 | Zn | K+ | 2 and 4 | S | H | $OC_2H_5$ | H | $SO_3Y$ | H | bluish-tinged red |
| 8 | Ni | Na+ | 2 and 4 | S | H | $SCH_3$ | H | $SO_3Y$ | H | violet |
| 9 | Co | Na+ | 2 and 4 | S | H | $CH_3$ | H | $SO_3Y$ | H | reddish violet |
| 10 | Cu | K+ | 0 | S | H | Cl | H | $SO_3Y$ | H | reddish violet |
| 11 | Ni | Na+ | 0 | S | H | $NO_2$ | H | $SO_3Y$ | H | violet |
| 12 | Zn | Na+ | 2 | S | H | —O—$CH_2$—O— | | $SO_3Y$ | H | bluish-tinged red |
| 13 | Cu | Na+ | 2 | S | —$CH_2$—O—$CH_2$—O— | | H | $SO_3Y$ | H | reddish violet |
| 14 | Co | K+ | 0 | S | H | Br | H | $SO_3Y$ | H | reddish violet |
| 15 | Cu | $NH_4^+$ | 0 | S | $CH_3$ | H | $CH_3$ | $SO_3Y$ | H | reddish violet |
| 16 | Ni | Na+ | 2 and 4 | S | H | $OCH_3$ | H | Br | H | violet |
| 17 | Zn | Na+ | 2 and 4 | S | H | $OCH_3$ | H | H | $COOC_2H_5$ | reddish violet |
| 18 | Cu | K+ | 2 and 4 | S | H | $OC_2H_5$ | H | H | COOH | bluish violet |
| 19 | Co | Na+ | 2 and 4 | S | H | $OCH_3$ | H | Cl | Cl | violet |

-continued

| No. | M(+2) | Y | n | Q | R¹ | R² | R³ | R⁴ | R⁵ | Colour shade (Polyamid) |
|---|---|---|---|---|---|---|---|---|---|---|
| 20 | Ni | Na⁺ | 2,4 and 6 | S | H | SCH$_3$ | H | —S—C$_6$H$_4$(o)— | | blue |
| 21 | Zn | Na⁺ | 2 u. 4 | S | H | OCH$_3$ | H | COCH$_3$ | H | bluish-tinged red |
| 22 | Cu | K⁺ | 2 u. 4 | S | H | OC$_2$H$_5$ | H | COC$_6$H$_5$ | H | reddish violet |
| 23 | Co | Na⁺ | 2 u. 4 | S | H | OCH$_3$ | H | —CO—C$_6$H$_5$(o)— | | violet |
| 24 | Cu | Na⁺ | 0 | O | H | H | H | SO$_3$Y | H | strongly bluish-tinged red |
| 25 | Zn | K⁺ | 0 | O | H | H | H | SO$_3$Y | H | reddish orange |
| 26 | Ni | Na⁺ | 0 | O | H | H | Cl | SO$_3$Y | H | very strongly bluish-tinged red |
| 27 | Co | Na⁺ | 0 | O | H | H | CH$_3$ | SO$_3$Y | H | strongly bluish-tinged red |
| 28 | Cu | Na⁺ | 0 | O | H | H | OCH$_3$ | SO$_3$Y | H | very strongly bluish-tinged red |
| 29 | Zn | K⁺ | 0 | O | CH$_3$ | H | CH$_3$ | SO$_3$Y | H | yellowish-tinged scarlet |
| 30 | Cu | Na⁺ | 0 | O | H | H | SO$_2$C$_2$H$_5$ | SO$_3$Y | H | bluish-tinged red |
| 31 | Zn | K⁺ | 0 | O | H | SO$_2$NH$_2$ | H | SO$_3$Y | H | reddish orange |
| 32 | Ni | Na⁺ | 2 u. 4 | O | H | OCH$_3$ | H | SO$_3$Y | H | reddish violet |
| 33 | Co | Na⁺ | 0 | NH | H | H | H | SO$_3$Y | H | reddish violet |
| 34 | Zn | K⁺ | 0 | NH | H | H | H | SO$_3$Y | H | orange |
| 35 | Cu | Na⁺ | 0 | NCH$_3$ | H | H | Cl | SO$_3$Y | H | reddish violet |
| 36 | Co | Na⁺ | 0 | NC$_2$H$_5$ | H | H | CH$_3$ | SO$_3$Y | H | reddish violet |
| 37 | Ni | Na⁺ | 0 | NC$_2$H$_5$ | H | H | SO$_2$C$_2$H$_5$ | SO$_3$Y | H | strongly bluish-tinged red |

Acid metal complex dyestuffs listed in the table which follows are also prepared analogously from the corresponding starting compounds.

| No. | M⁺² | Y | n | R⁴ | R⁵ | ⟩=N—A | Colour shade (polyamide) |
|---|---|---|---|---|---|---|---|
| 38 | Cu | Na⁺ | 0 | SO$_3$Y | H | (H-N, benzoyl-pyridyl group) | strongly bluish-tinged red |
| 39 | Ni | Na⁺ | 2 | SO$_3$Y | H | " | strongly bluish-tinged red |
| 40 | Zn | K⁺ | 2 | SO$_3$Y | H | (CH$_3$-N, benzoyl-pyridyl group) | reddish orange |
| 41 | Co | Na⁺ | 0 | SO$_3$Y | H | (CH$_3$-N, sulfonyl-pyridyl group) | strongly bluish-tinged red |

-continued

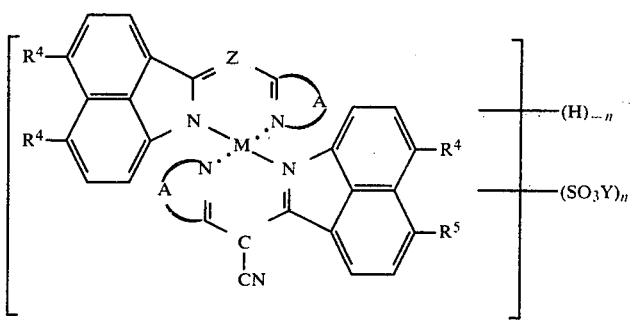

| No. | $M^{+2}$ | Y | n | $R^4$ | $R^5$ | | Colour shade (polyamide) |
|---|---|---|---|---|---|---|---|
| 42 | Ni | $Na^+$ | 0 | $SO_3Y$ | H | (thiazole-phenyl hydrazone) | reddish orange |
| 43 | Zn | $NH_4^+$ | 0 | $SO_3Y$ | H | (phenyl hydrazone) | reddish orange |
| 44 | Cu | $K^+$ | 0 | $SO_3Y$ | H | (N-methyl acetanilide) | violet |
| 45 | Co | $Na^+$ | 0 | $SO_3Y$ | H | (methylthio-CH₃ group) | bluish-tinged red |
| 46 | Ni | $Na^+$ | 0 | $SO_3Y$ | H | (2-pyridyl) | bluish-tinged red |
| 47 | Zn | $Na^+$ | 0 | H | $COOC_2H_5$ | (sulfo-benzamide hydrazone) | red |
| 48 | Cu | $K^+$ | 0 | $SO_3Y$ | H | (2-quinolyl) | violet |

EXAMPLE 49

12.8 of g dyestuff of the formula (1a) are dissolved in 250 ml of hot water and 5 g of copper-II chloride (dihydrate) are added. The pH value is then brought to 7 by dropwise addition of about 14 ml of 25% strength aqueous ammonia solution and the mixture is heated for 15 minutes at 95°–100° C., mixed with 2 ml of glacial acetic acid and allowed to cool, whilst stirring. After 6 hours, the crystalline precipitate is filtered off, thoroughly pressed out and dried at 50° C. in vacuo. Yield: 11.8 g of dyestuff of the formula (1).

EXAMPLE 50

13 g of dyestuff of the formula

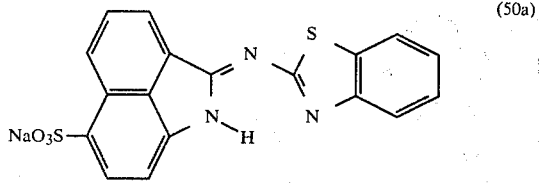
(50a)

are dissolved in 250 ml of hot water, 20 g of zinc acetate (dihydrate) are added and the mixture is boiled under reflux for 1 hour. 20 ml of saturated sodium chloride solution are added and the mixture is then stirred for 5 hours, until cold. The crystalline precipitate is filtered off, thoroughly pressed out and dried in vacuo at 50° C. Yield: 13 g of dyestuff of the formula

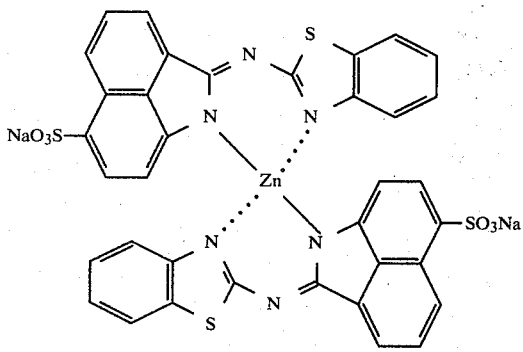

Yellow crystals which dye synthetic polyamide from neutral solution in a clear yellow shade having good fastness characteristics.

The following metal complexes of (50a), having the same type of structure and similar valuable tinctorial properties, are prepared analogously:

| (51) | copper-II complex | (reddish-tinged yellow) |
| (52) | nickel-II complex | (reddish-tinged yellow) |
| (53) | cobalt-II complex | (reddish-tinged yellow) |
| (54) | manganese-II complex | (reddish-tinged yellow) |
| (55) | iron-II complex | (reddish-tinged yellow) |

Compound (50a) can be obtained if the compound described in French Patent Specification No. 1,388,599, Example 1, is subjected to sulphonation and working-up by the method described in German Offenlegungsschrift No. 2,357,442, Example 11.

EXAMPLE 56

5 g of a synthetic polyamide fabric dyed with compound (1a) (0.6% strength dyeing, yellowish orange) are introduced into a solution of 2 g of zinc chloride and 5 g of sodium acetate in 200 ml of water which is heated to the boil for 3 minutes, and the fabric is then rinsed and dried. It exhibits the clear scarlet shade of the zinc-II complex of the formula (3).

EXAMPLE 57

5 g of a wool fabric dyed with compound (1a) (0.6% strength dyeing, yellowish orange) are treated in the same manner as described in Example 56. A very clear scarlet shade (compound (3)) having good fastness characteristics is obtained.

We claim:

1. Acid monomethine-metal complex dyestuffs of the formula

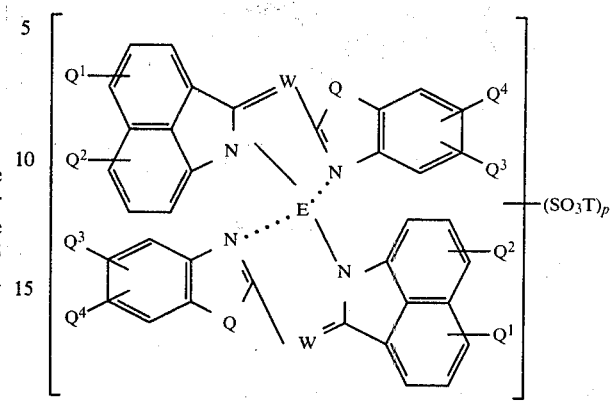

wherein
W represents =N— or =C(CN)—,
E represents divalent nickel, cobalt, zinc or copper,
Q represents —S—, —O— or —N(D)—,
D represents hydrogen, optionally OH—, Cl—, CN—, $C_1$–$C_4$-alkoxycarbonyl- or $CONH_2$-substituted $C_1$–$C_3$-alkyl, benzyl or phenyl, or $C_1$–$C_2$-alkoxycarbonyl,
T represents hydrogen, an alkali metal or ammonium ion or the monovalent equivalent of E,
p represents the numbers 2, 4 or 6,
$Q^1$ represents hydrogen, chlorine, bromine, $C_1$–$C_2$-alkoxy, CN, carboxyl, $C_1$–$C_4$-alkoxycarbonyl or a carbamoyl radical which is optionally substituted by one or two $C_1$–$C_4$-alkyl radicals,
$Q^2$ represents hydrogen, $C_1$–$C_2$-alkyl, chlorine, bromine, iodine, $C_1$–$C_4$-alkoxycarbonyl, benzoyl, $C_1$–$C_4$-alkylsulphonyl, including $\beta$-sulphatoethylsulphonyl, benzylsulphonyl, phenylsulphonyl, nitro, cyano, $C_1$–$C_4$-alkoxycarbonyl, carboxyl, a sulphamoyl or carbamoyl radical which is optionally monosubstituted or disubstituted by $C_1$–$C_4$-alkyl, benzyl and/or phenyl radicals, amino, acetylamino, $C_1$–$C_4$-alkylsulphonylamino, phenylsulphonylamino, di-($C_1$–$C_4$-alkyl)-amino, piperidino, morpholino, pyrrolidino, $C_1$–$C_4$-alkoxy, phenoxy, $C_1$–$C_4$-alkylmercapto or phenylmercapto,
$Q^1$ and $Q^2$ together can also represent o-phenylenemercapto or o-phenylenecarbonyl,
$Q^3$ represents hydrogen, $C_1$–$C_4$-alkyl, $CF_3$, chlorine, bromine, $C_1$–$C_4$-alkoxy (which is optionally substituted by OH, $C_1$–$C_4$-alkoxy or chlorine), phenoxy, phenyl, benzyl, cyclohexyl, $C_1$–$C_4$-alkoxycarbonyl, CN, carboxyl, $C_1$–$C_4$-alkylsulphonyl, phenylsulphonyl, nitro, $C_1$–$C_4$-alkylmercapto or a sulphamoyl or carbamoyl radical which is optionally substituted by one or two $C_1$–$C_4$-alkyl radicals,
$Q^4$ represents hydrogen, $C_1$–$C_4$-alkyl, $CF_3$, chlorine, bromine, $C_1$–$C_2$-alkoxy or phenyl and
$Q^3$ and $Q^4$ together, when in the o-position to one another, can also represent divalent radicals of the formula —O—$CH_2$—O—, —O—$CH_2$—$CH_2$—O—, —O—$CH_2$—O—$CH_2$—, —CH=CH—CH=CH—, —($CH_2$)$_4$— or —$CH_2$—C($CH_3$)$_2$—$CH_2$—.

2. Acid monomethine-metal complex dyestuffs of the formula

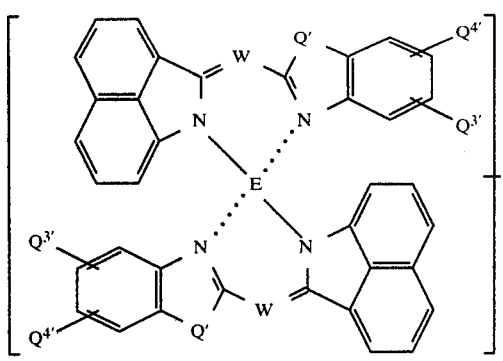
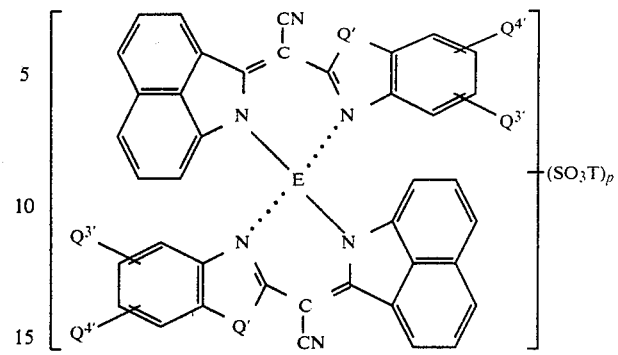

wherein
W, E, T and p have the same meaning as in claim 1
and in which
Q' represents —S— or —O—,
Q$^{3'}$ represents hydrogen, C$_1$–C$_4$-alkyl, chlorine, bromine, C$_1$–C$_4$-alkoxy, C$_1$–C$_4$-alkylsulphonyl, nitro or sulphamoyl and
Q$^{4'}$ represents hydrogen, methyl or chlorine
and wherein in each case one of the SO$_3$T groups in the 1,8-naphtholactam occupies the p-position relative to the ring nitrogen atom.

3. Acid monomethine-metal complex dyestuffs of the formula wherein
E, T, p, Q', Q$^{3'}$ and Q$^{4'}$ have the meaning given in claim 2
and wherein in each case one of the SO$_3$T groups in the 1,8-naphtholactam occupies the p-position relative to the ring nitrogen atom.

4. Process for dyeing wool and polyamide fibres, characterised in that fibres which are dyed with acid dyestuffs of the formula
wherein
W, Q, Q$_1$, Q$_2$, Q$_3$, Q$_4$ T and p have the same meaning as in claim 1, are after-treated, under warm conditions, with divalent metal salts of the first, second, seventh or eighth subgroup of the periodic table.

* * * * *

UNITED STATES PATENT AND TRADEMARK OFFICE
CERTIFICATE OF CORRECTION

PATENT NO. : 4,268,668   Page 1 of 2
DATED : May 19, 1981
INVENTOR(S) : Horst Hanisch et al It is certified that error appears in the above—identified patent and that said Letters Patent is hereby corrected as shown below:

Title Page, Right hand column, last line delete "2 Drawing Figures"
Column 2, line 14, delete "oxidazole" and substitute --oxdiazole--.
    line 54, delete "$CH_2$-$CH_2$-CH-" and insert --$CH_2$-$CH_2$-$CH_2$--.

Column 9-10, lines 30 et seqa and Columns 11-12, line 1 et seqa delete structural formula and substitute with --
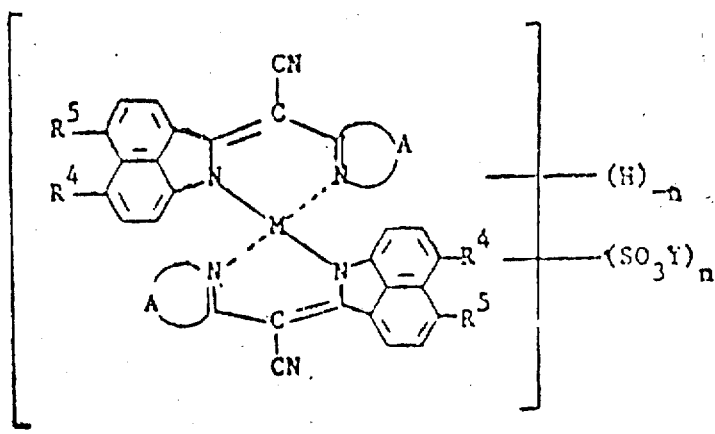
--.

UNITED STATES PATENT AND TRADEMARK OFFICE
CERTIFICATE OF CORRECTION

PATENT NO. : 4,268,668
DATED : May 19, 1981
INVENTOR(S) : Horst Hanisch et al

It is certified that error appears in the above—identified patent and that said Letters Patent is hereby corrected as shown below:

Column 16, line 25 after "formula" insert structural formula

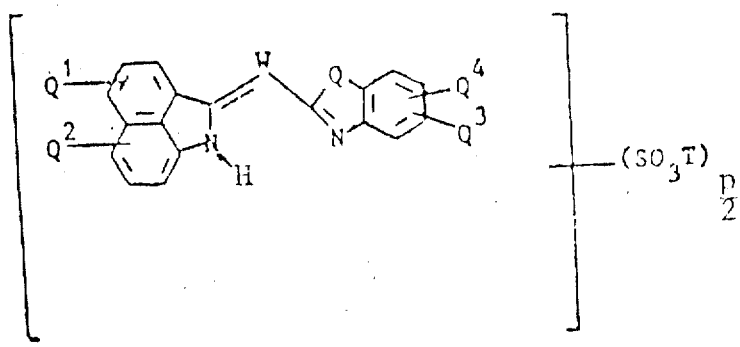

Signed and Sealed this

Twenty-third Day of March 1982

|SEAL|

Attest:

GERALD J. MOSSINGHOFF

Attesting Officer     Commissioner of Patents and Trademarks